UNITED STATES PATENT OFFICE.

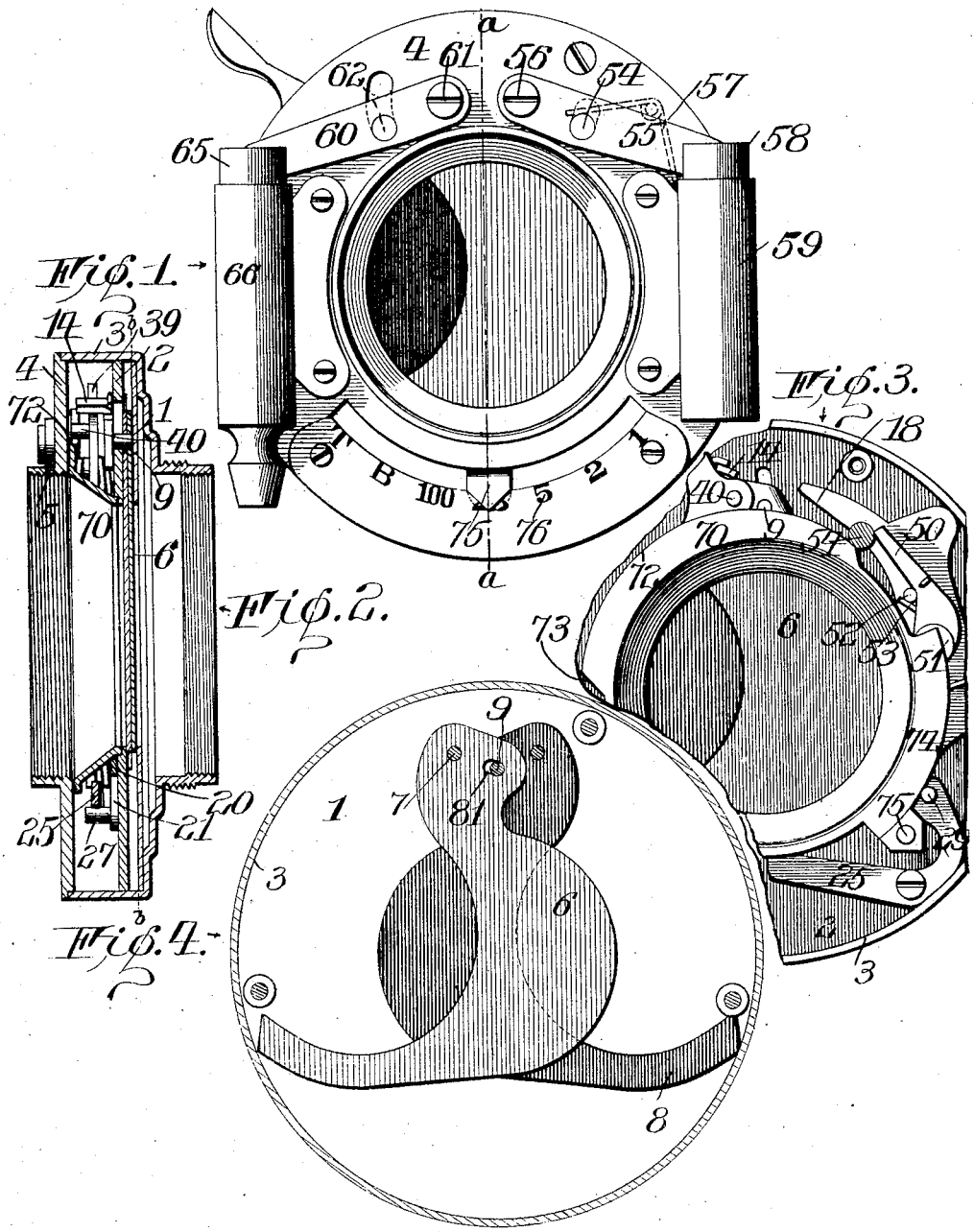

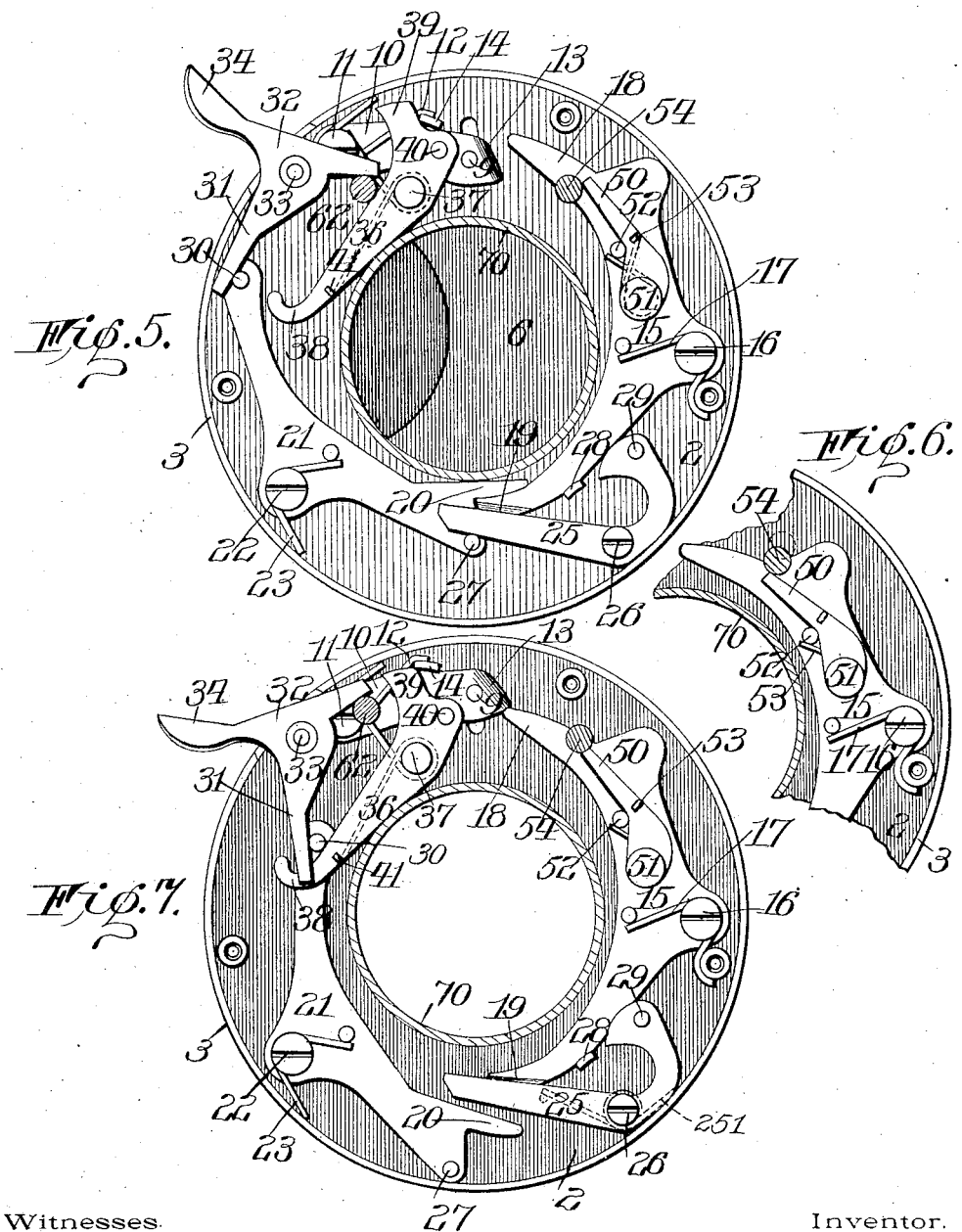

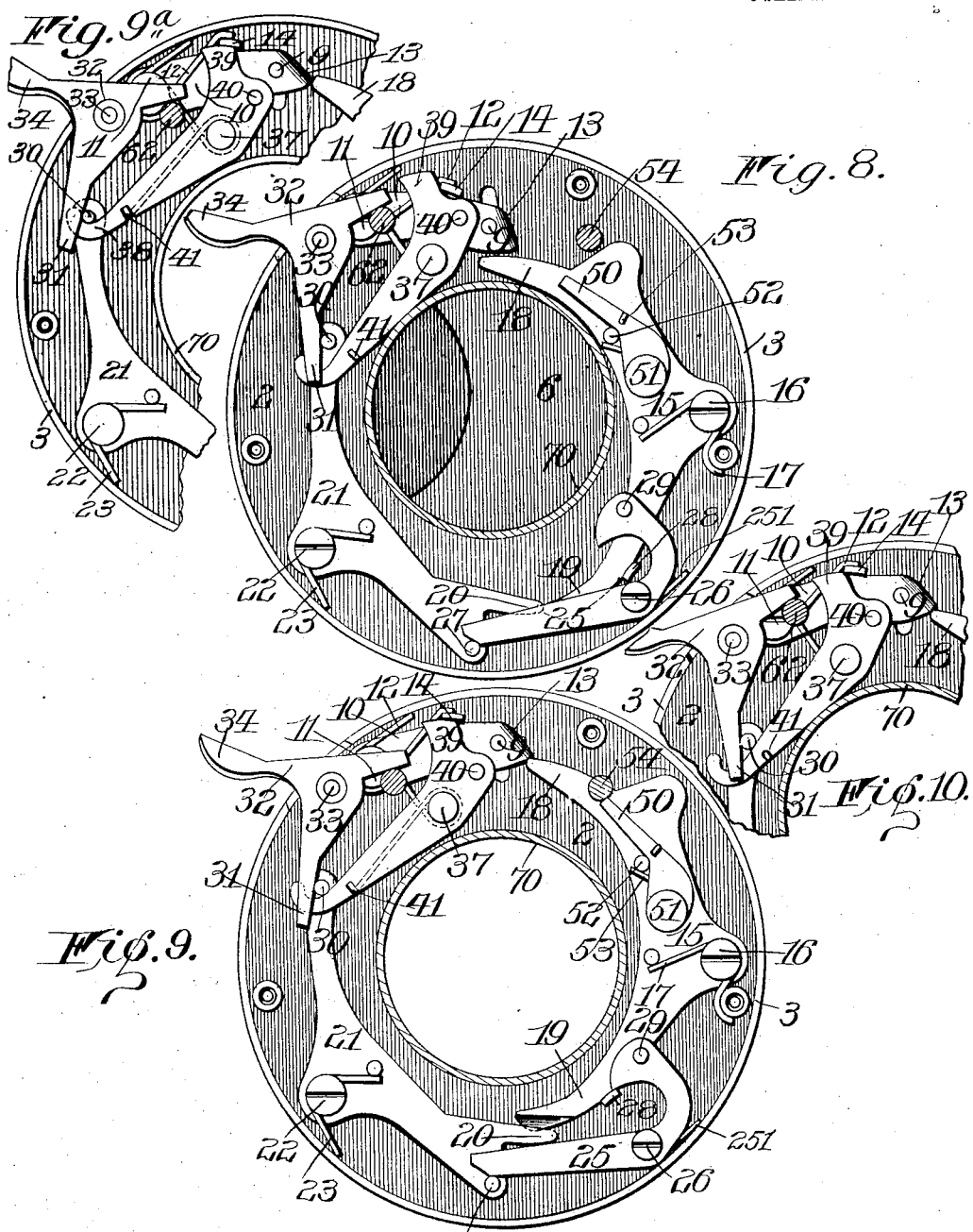

RUDOLPH KLEIN, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

No. 852,962.      Specification of Letters Patent.      Patented May 7, 1907.

Application filed December 24, 1904. Serial No. 238,196.

*To all whom it may concern:*

Be it known that I, RUDOLPH KLEIN, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photographic shutters particularly that kind known as automatic shutters in which by the operation of a single part in one direction the actuating device may be placed under tension and released to cause an exposure to be made, and the kind of exposure, that is, whether time, bulb or instantaneous, may be previously determined and the various operations necessary to cause these exposures may be controlled by the movement of the part actuated by the operator.

The invention has for its object to simplify the construction and operation of shutters of this class whereby the various parts may all be made from simple stampings of sheet metal and may be readily assembled.

In the accompanying drawings: Figure 1 is a front elevation of a shutter constructed in accordance with my invention. Fig. 2 is a vertical sectional view of the same on the line a—a of Fig. 1. Fig. 3 is an elevation of the parts with the front cover removed showing the setting ring or plate. Fig. 4 is a vertical sectional view on the line b—b of Fig. 2 looking toward the front of the shutter and showing the shutter wings or blades. Fig. 5 a view of the operating parts of the shutter with the front plate removed showing their position when set for automatic time exposure of greatest duration, the shutter being closed. Fig. 6, a similar view showing the latch on the master member engaged with the retarding device and before the shutter is opened. Fig. 7 a similar view showing the shutter open and about to close. Fig. 8 a similar view showing the position of the parts during the making of a time exposure, with the shutter closed and before being released from the operating member. Fig. 9 a similar view showing the shutter open and the master member retained by one of the time stops during the making of a time exposure. Fig. 9ª a view of the parts when the operating member 10 is held by the catch 36 alone. Fig. 10 a similar view showing the position of the parts before the completion of a bulb exposure.

Similar reference numerals indicate similar parts in the several figures.

The main casing of the shutter embodies a back plate 1 having the central threaded tube for application to the camera casing or support and recessed for the application of the ordinary iris diaphragm, the outer edge of this plate being provided with an annular flange 3, to the front of which is applied the plate 4 having the threaded tube or ring 5 to which the front lens is adapted to be secured. 2 indicates an annular plate or septum having a central aperture and secured within the casing upon which the operating plates of the shutter are mounted.

6 indicates the shutter wings or blades pivoted at 7 to the plate 2 having the central overlapping portions and the extensions 8 on the ends. These blades or plates are arranged to overlap as shown in Fig. 4 and near their pivotal points are provided with slots 81 in which operates a pin 9 secured to an oscillatory lever 10 and projecting through a slot in the plate 2. The lever 10 is pivoted at 11 and is operated by a spring 12 toward the central aperture, the relation of the pin 9 and the slots in the shutter blades being such that when the lever is in its lowermost position the shutter blades will overlap, closing the aperture, as shown in Figs. 4 and 5. The outer edge of the lever 10 is curved or beveled at 13 and is also provided at its upper side with a stop or projection 14.

15 indicates a master member or lever pivoted at 16 on the plate 2 and normally held in the position shown in Fig. 5 by the operating spring 17 extending around the pivot and engaging a projection on the said member. The upper end 18 of the member 15 is beveled at the lower portion of its under side, so that when moved downwardly the beveled portions 18 and 13 will engage and the members 15 and 10 will slide past each other, the end of the master member yielding laterally or in a plane parallel with its pivot for this purpose, but when the master member is moved in the opposite direction the outer side of the portion 18 will engage with and lift the lever 10 as shown in Fig. 7 operating said lever and throwing the shuttter blades open until it passes off the end of the lever, permitting the return of the latter and the closing of the shutter by the action of the spring 12.

It should be stated that the spring 17 is stronger than the spring 12 so that it may operate the shutter members in opposition to the force of the latter. The lower end of the master member 15 is beveled or inclined at its outer side at 19 and opposite said beveled portion is provided with a shoulder adapted to be engaged by the end of a lever 21 pivoted at 22 and normally held in the position shown in Fig. 5 by means of a spring 23. The rear side of the end 20 is beveled or inclined in the same direction as the portion 19 of the master member and the lever itself is adapted to yield laterally of the plane of its pivotal movement the construction being such that when the lower end of the lever 21 is moved downwardly it will carry with it the master member turning the latter on its pivot until the end passes off of said member by reason of the different pivotal centers (see Fig. 8) allowing the master member to return to normal position, and when the lever 21 is returned to the position shown in Fig. 5 the end 20 will slide over the end of the master member, this construction forming a latch connection which causes the operation and release of the master member when moving in one direction and the independent movement of the parts in the opposite direction.

25 indicates a stop or catch pivoted at 26 operated by a spring 251 and having the extended end adapted to be engaged by a pin 27 on the lever 21, the other end of said catch 25 being bent around and constituting a catch or stop adapted to coöperate at times with the lug or projection 28 on the lower portion of the master member. This catch 25 is also provided with a pin 29 by which it may be adjusted as will be described.

The upper end of the lever 21 is provided with a pin or projection 30 adapted to be engaged by an arm 31 of an operating member or lever 32 pivoted at 33 and having a handle or operating portion 34 projecting to the exterior of the casing.

36 indicates a stop or catch pivoted at 37 having a hooked lower end 38, an upwardly extending lug or shoulder 39 and an outwardly projecting pin 40, said lever being operated upon by a spring 41 tending to throw the hooked end outwardly into position to be engaged by the pin 30 on the lever 21. The projection 39 is arranged to coöperate with the projection 14 on the lever 10 and the projection 40 is adapted to be operated upon and controlled by a suitable controlling plate or member which controls the position of the projection 39 relative to the projection 14 on the lever 10.

The parts described, in connection with a suitable controlling member are adapted for making time, instantaneous and bulb exposures but for automatically timed exposures a retarding device is required which is connected to the operating parts, preferably the master member by a latch connection permitting the free movement of the shutter in one direction without operating the said device but controlling it in the opposite direction as will be described.

Mounted upon the master member above its pivot is a pawl 50 pivoted at 51 and normally held against a stop 52 by a spring 53, said pawl being arranged to coöperate with a stud or pin 54 mounted on a lever 55 constituting a portion of the retarding device or brake which controls the operation at certain times, of the master member and regulates the length of time the shutter blades are open. This lever 55 is pivoted at 56 upon the front plate 4 and is normally moved in a downwardly direction by a spring 57, the outer free end of the lever being pivotally connected with a piston 58 operated in a cylinder 59. Also mounted upon the front plate is a lever 60 pivoted at 61 and having an operating pin or projection 62 extending into the casing and between the inwardly projecting end of the lever 32 and the outer side of the lever or catch 36 as shown in Figs. 1 and 5, et seq. The outer end of this lever is pivotally connected to the piston 65 operating in a cylinder 66 and constituting a pneumatic engine of the usual or any preferred description actuated by air pressure from a suitable bulb.

70 indicates a controlling ring or member having an inwardly turned flange rotating in a recessed portion of the septum or plate 2 and having its outer portion or flange in contact with the rear side of the front plate 4 around the aperture, serving to protect the interior parts from dust and dirt. The outer periphery of this controlling member or plate 70 is formed with a gradually tapering cam edge 72 terminating at the one end in a shoulder 73 and at the opposite side of the center is provided with a concentric edge or surface 74. The plate 70 is further provided with a pointer or index 75 extending through a slot in the casing and adapted to coöperate with a scale on the plate 76 and embodying the letters "T", "B" and the fractional time indications, "100", "25", "5," "2," and the figure 1 the letters indicating time and bulb exposures, the numerals indicating exposures of parts of a second and the figure 1 indicating an exposure of one second and if desired other figures could be employed indicating longer exposures.

In order to set the shutter for making a time exposure the index on the setting plate is moved over the letter "T" which removes the surfaces 72 and 74 from engagement with the pins 40 and 29 on the catches 36 and 25 respectively, and causes the cam 72 to engage the pin 54 on the retarding device and hold it out of the path of the pawl 50. The parts being now in the position shown in Fig. 5, the operator moves the outer end of lever 32 down, either by the handle or the engine turning the lever 21 and the master member 15 to the position shown in Fig. 8, putting the spring 17 under tension and causing the operating end 18 of the member to pass by and beneath the end of the lever 10, and as soon as the end 20 of the lever 21 becomes disengaged from the master member, the latter will be returned by its spring, throwing the shutter open until the projection 28 is engaged by the catch 25, then, upon releasing the pressure on the lever 32, the spring 23 will move the lever 21 upward far enough to cause the pin 27 to engage the catch 25 and release it from the master lever. When the shutter lever 10 was raised by the master member and just before being released therefrom as shown in Fig. 9, the end 39 of the catch 36 passed beneath the projection 14 on the lever 10 and prevented the return of the latter, so that the shutter is held open by the catch 36, (see Fig. 9a),—the lever 21 being retained by the hooked end 38 of the catch 36. After the shutter has remained open the desired length of time, a second operation of the lever 32 will turn the catch 36 and move the projection 39 from beneath the lug 14, allowing the shutter to be closed by its operating spring 12.

When it is desired to make a bulb exposure, it is only necessary to move the setting member or plate 70 far enough to cause the cam 73 to engage the pin 40 and hold the catch 36 out of coöperative relation with the shutter lever 10, in which position, when the shutter is thrown open by the master member the latter will be engaged by the catch 25 and held until the lever 21 is permitted to return, when the pin 27 thereon engaging the tail of the catch 25 will release the master member allowing it to move out of engagement with the shutter lever 10 and permitting the spring to close the shutter, the length of the exposure being determined by the time pressure is maintained on the lever 32.

When it is desired to make an instantaneous exposure of brief duration the plate 70 is moved one step farther, so that the index will coöperate with "100" on the scale. This will bring the portion 74 of the controlling plate into engagement with the pin 29 on the catch 25 holding this out of the path of movement of the master member, so that by the movement of the lever 32 and through it the lever 21, the master member will be operated and released and during its movement caused by its spring, will open and permit the closing of the shutter blades, no action by the catch 36 being necessary as its projection 39 is at the left of the projection 14 on the lever 10.

When it is desired to make an automatically timed exposure, say for one second, the plate 70 is moved so that the index coöperates with the numeral 1 on the scale, at which time both the catches 36 and 25 are out of the paths of movement of the parts with which they coöperate and the pin 54 connected with the pneumatic retarding device is permitted to move far enough inward or toward the center so that when the master member is moved in the direction to engage the shutter lever 10, the pawl 50 engaging the projection 54 will yield and pass beyond said pin to the position shown in Fig. 6, and then upon the release of the master member, the end of the pawl engaging the pin 54 will move the lever 55 outward against the tension of the spring 57 and against the pressure of the atmosphere exerted on the piston 58 until, by reason of the diverging arcs, through which the end of the pawl and the pin 54 move, it becomes disengaged from the latter and the master member releasing the shutter lever allows the shutter to close. The distance that the pawl 50 on the master member travels before engaging the pin 54 is determined by the adjustment of the cam 72 on the setting plate 70 which regulates the position of said pin, and the length of time that the shutter remains open, depends upon the distance that the lever of the retarding device moves after the engagement of the pawl therewith.

The parts of the shutter thus described are very simple and cheap and the master member and lever 21 being made of spring material it is only necessary to bevel the ends to form the laterally yielding latch connections between these parts and also between the master member and the shutter lever 10.

In this shutter it will be noted that the shutter operating lever is controlled independently of the master member or part 15, after the shutter is opened, and that for instantaneous and automatically timed exposures neither of the retaining stops 36 nor 25 is operated, as they are held in inoperative position by the controlling ring.

While the light excluding medium shown herein is in the form of the blades or wings it will be understood that this is but one form and it is immaterial whether or not two blades are employed and therefore the terms blade and blades in the claims is intended to refer to equivalent devices as the particular construction of these parts is not essential to the operation of the novel features.

The term latch connection herein is used to mean a connection which will permit the yielding of the parts in one direction without causing any functional movement and in the other direction to cause a movement to accomplish the function of the part.

I claim as my invention:

1. In a photographic shutter, the combination with the blades, the spring actuated blade operating member, and a catch coöperating therewith, of a master member having a latch connection with the blade operating member, and means for operating and releasing the master member.

2. The combination with the spring actuated blade operating member and a catch coöperating therewith of a master member having a latch connection with the blade operating member, means for operating and releasing the master member and a catch for the master member controlled by the operating means.

3. The combination with the blades, the spring actuated blade operating member, and a catch coöperating therewith, to hold the blades open, of a master member having a latch connection with the operating member and means for operating the master member and controlling the catch.

4. The combination with the blades, the spring actuated blade operating member and a catch coöperating therewith, of a master member having latch connection with the blade operating member, a catch coöperating therewith and operating means for actuating the master member in one direction and coöperating with the two catches to control them.

5. The combination with the blades, the spring actuated blade operating member, and a catch coöperating therewith, of a master member having a latch connection with the operating member, a catch coöperating with the master member, and a member having a latch connection with the master member and coöperating with the two catches to actuate them.

6. The combination with the blades, the spring actuated blade operating member and a catch coöperating therewith, of a master member having a latch connection with the operating member, a catch coöperating with the master member, a member having a latch connection with the master member and coöperating with the two catches to actuate them and means for adjusting the two catches relatively to said member.

7. The combination with the blades, the spring actuated blade operating member and the spring operated catch coöperating therewith to hold the blades open, of devices for actuating and releasing the blade operating member, a catch for controlling said devices and holding the operating member with the shutter open, means for operating said catches and means for adjusting either or both of said catches out of coöperative relation with the parts controlled by them.

8. The combination with the blades, the spring actuated blade operating member, and the spring operated catch coöperating therewith, of means for moving and releasing the blade operating member and an operating device therefor coöperating with the before mentioned catch to control its position.

9. The combination with the blades, the spring actuated blade operating member having the projection and the spring operated catch coöperating therewith to hold the blades open, of an operating member controlling the before mentioned catch and mechanism actuated by said member for actuating and releasing the blade operating member and an adjustable catch for said mechanism controlled by the operating member.

10. The combination with the blades, the spring operated blade operating member, and the catch coöperating therewith, of the spring operated master member having a latch connection with the blade operating member, the catch for engaging the master member and an intermediate member having a latch connection with the master member and controlling the two catches to permit their alternate engagement with their coöperating parts.

11. The combination with the blades and the spring operated blade operating member having the projection 14 of the catch 36 having the projections 39 and 40 and an adjustable stop coöperating with the projection 40.

12. The combination with the blades, the spring operated blade operating member and the catch 36 controlling it, of the master member having a latch connection with the blade operating member, the catch 25 coöperating with the master member and means for controlling the catch, the spring operated intermediate member 21, coöperating with the catches 36 and 25 and having a latch connection with the master member.

13. The combination with the blade and the spring operated blade operating member having the beveled end, of the master member 15, having the beveled end, coöperating with that of the blade operating member, the projection 28 and the beveled end 19, the catch 25 and the spring operated member 21 having the beveled end 20 and the projection 27 coöperating with the catch 25.

14. The combination with the blade, the spring operated blade operating member 10, having the projection 14 and the catch 36 having the projection 39 and the hook 38, of the pivoted master member 15, having the projection 28, the intermediate member 21 having the projections 30 and 27, the spring operated catch 25 for engaging the projection 28 on the master member and engaged by the projection 27 on the intermediate member and the actuating member 32 engaging the projection 30 on the intermediate member and latch connections between one end of the master member and the operating member and between the other end of the master member and the intermediate member 21.

15. The combination with the shutter blade the pivoted spring operated master member controlling it and the pawl pivoted on the master member, of a movable retarding device having a projection coöperating with said pawl and movable thereby and means for adjusting said projection relative to the path of movement of the pawl to vary the point in the movement of the latter when it shall become engaged with and operate the retarding device.

16. The combination with the shutter blade, the pivoted master member for operating it, and the pawl carried thereby, of a pneumatic retarding device embodying a pivoted lever having a projection with which the pawl coöperates and means for adjusting the projection into and out of the path of movement of the pawl to vary the point in its movement at which the pawl engages with the lever projection.

17. The combination with the shutter blade, and a pivoted master member for operating it, and the pawl pivoted on the member, of a pneumatic retarding device embodying a pivoted lever having a projection thereon arranged in the path of movement of the pawl and means for adjusting the lever to carry the projection into and out of the path of the pawl.

18. The combination with the shutter blade and the blade operating member, the catch controlling it, the master member having a pawl thereon, a latch connection between said master member and the operating member and the catch controlling the master member, of a pneumatic retarding device embodying a movable member having a projection thereon with which the pawl on the master member coöperates and a setting device coöperating with the catches and with the projection on the movable member to vary the relations between these parts for causing different exposures.

RUDOLPH KLEIN.

Witnesses:
  G. WILLARD RICH,
  WALTER B. PAYNE.